United States Patent
Popelak et al.

[15] 3,665,002
[45] May 23, 1972

[54] 5-PHENYL-TETRAZOLE DERIVATIVES

[72] Inventors: Alfred Popelak, Mannheim; Ansgar Lerch, Kirrlach/Baden; Kurt Stach, Mannheim-Waldhof; Egon Roesch, Lampertheim; Klaus Hardebeck, Ludwigshafen/Rhine, all of Germany

[73] Assignee: Boehringer Mannheim GmbH, Postfach, Germany

[22] Filed: Dec. 18, 1969

[21] Appl. No.: 886,369

[30] Foreign Application Priority Data

Dec. 20, 1968 Germany....................P 19 15 922.3

[52] U.S. Cl...................260/239.9, 260/239.65, 260/397.7, 424/229
[51] Int. Cl.................................C07d 57/00, C07c 143/80
[58] Field of Search....................260/239.65, 239.9, 308 D

[56] References Cited

UNITED STATES PATENTS 3,294,813  12/1966  Juby.....................260/308

*Primary Examiner*—Henry R. Jiles
*Assistant Examiner*—C. M. Shurko
*Attorney*—Burgess, Dinklage & Sprung

[57] ABSTRACT

Novel 5-phenyl-tetrazole derivatives of the general formula:

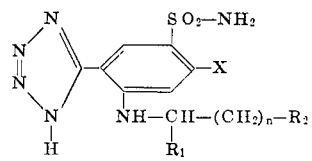

wherein X is a halogen atom, an azido group or a trifluoromethyl radical, $R_1$ is a hydrogen atom or a lower alkyl radical, $R_2$ is a phenyl, furyl or thienyl radical and $n$ is 0, 1 or 2; and the pharmacologically compatible salts thereof, possess exceptional diuretic and saluretic properties.

7 Claims, No Drawings

5-PHENYL-TETRAZOLE DERIVATIVES

The present invention is concerned with new 5-phenyl-tetrazole derivatives and therapeutic compositions containing the same as well as with therapeutic uses thereof, particularly in diuretic and saluretic applications.

The new 5phenyl-tetrazole derivatives according to the present invention are compounds of the general formula:

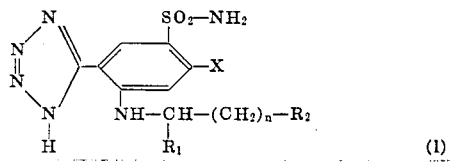

wherein X is a halogen atom, an azido group or a trifluoromethyl radical, $R_1$ is a hydrogen atom or a lower alkyl radical, $R_2$ is a phenyl, furyl or thienyl radical and $n$ is 0, 1 or 2; and the pharmacologically compatible salts thereof.

We have found that the new 5-phenyl-tetrazole derivatives of general formula (I) possess outstanding diuretic and saluretic properties.

The new compounds according to the present invention can be prepared, for example, by one of the following methods:

a. reaction of compounds of the general formula:

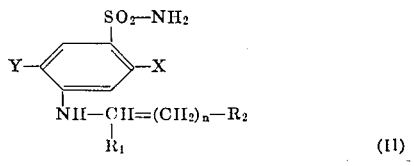

in which X, $R_1$, $R_2$ and $n$ have the same meanings as above and Y is a nitrile, imido-ester, amidine or amidrazone group, with hydrazoic acid or nitrous acid or reactive derivatives thereof; or b. reaction of compounds of the general formula:

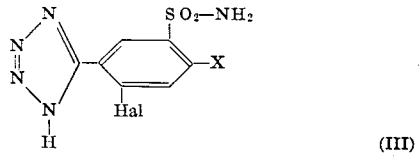

in which X has the same meaning as above and Hal is a halogen atom, with an amine of the general formula:

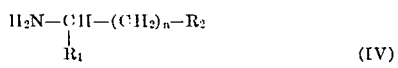

in which $R_1$, $R_2$ and $n$ have the same meanings as above; or c. reaction of compounds of the general formula:

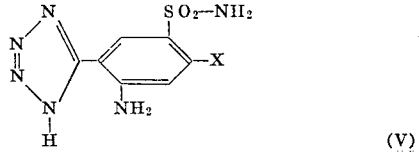

in which X has the same meaning as above, with a compound of the general formula:

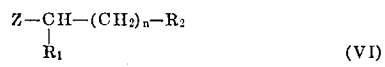

in which Z is a reactive ester group and $R_1$, $R_2$ and $n$ have the same meanings as above; or d. reaction of compounds of general formula (V) with compounds of the general formula:

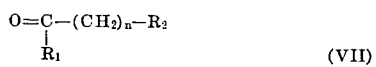

in which $R_1$, $R_2$ and $n$ have the same meanings as above, with simultaneous or subsequent hydrogenation; or e. for the case in which $R_1$ is to be a hydrogen atom, reaction of compounds of general formula (V) with reactive derivatives of carboxylic acids of the general formula:

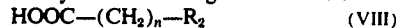

$$HOOC-(CH_2)_n-R_2 \qquad (VIII)$$

in which $R_2$ and $n$ have the same meanings as above, followed by reduction, whereafter, if desired, the compounds obtained are converted into their pharmacologically compatible salts.

For the conversion of the substituent Y into a tetrazole ring, the compounds (II), in which Y is a nitrile, imido-ester or amidine group, are reacted with hydrazoic acid or with a salt thereof. The reaction with hydrazoic acid takes place by simple heating of the reaction components in an inert solvent, preferably in dimethyl formamide. Instead of hydrazoic acid, it is better to use the alkali metal salts thereof, for example sodium azide, which are easier to handle and to activate these in the reaction mixture, for example by the addition of an ammonium halide. When Y is an amidrazone group, this is converted into a tetrazole ring by reaction with nitrous acid or with the esters or salts thereof.

For the amination of compounds (III) with compounds (IV), it is necessary to use those compounds (III) in which the halogen atom Hal is exchanged more easily and quickly than the substituent X. In general, this is even the case when both the substituents are the same, since, however, fluorine atoms are exchanged particularly easily, the selectivity of the reaction and the yields can be increased substantially by using the corresponding fluorine-substituted derivatives (III). The exchange best takes place at the lowest possible temperature and in an inert solvent for example, ethanol or dioxan; however, tetrahydrofuran has proved to be especially useful for this purpose. It is, however, also possible to use an excess of the amine (IV) as solvent.

As compounds (VI) with a reactive ester group, there can be used, for example, halides and sulphonic esters which can readily be split off, such as tosylates, brosylates or mesylates.

When compounds (V) are reacted with carbonyl compounds (VII), then the corresponding Schiff bases are obtained which can subsequently be hydrogenated either catalytically or with the use of reducing agents, for example, sodium borohydride or dimethylaminoborane. Furthermore, it is possible to carry out a reductive amination of the carbonyl compounds (VII) with compounds (V) in the presence of formic acid in a single reaction step by means of the Leuckart reaction.

As reactive derivatives of carboxylic acids (VIII), there are preferably used the halides or esters and the N-substituted carboxylic acid amides obtained as intermediates are reduced with strong reduction agents, for example lithium aluminum hydride.

As physiologically compatible salts, the alkali metal, alkaline earth metal and ammonium salts are especially preferred. They can be prepared in known manner, for example, by reaction with a solution of an alkali metal hydroxide, such as of sodium hydroxide, or with an aqueous solution of ammonia or with the corresponding carbonates.

The pharmaceutical compositions according to the present invention comprise at least one of the new 5-phenyltetrazole derivatives, in admixture with a solid or liquid pharmaceutical carrier or diluent.

The following Examples are given for the purpose of illustrating the present invention:

Example 1

5-(4'-Chloro-2'-furfurylamino-5'-sulphamoyl)-phenyl-tetrazole 8.75 Grams 4-chloro-2-furfurylamino-5-sulphamoyl-benzonitrile are dissolved in 100 milliliters dimethyl formamide, mixed with 3.6 grams sodium azide and 3.02 grams ammonium chloride and heated to 100°C. for 3 hours, while stirring. The solvent is then distilled off in a vacuum and the oily residue dissolved by the addition of water and 2N sodium hydroxide solution. The solution thus obtained is purified with activated charcoal, filtered and rendered weakly acidic with acetic acid. The precipitated product is filtered off with suction, washed, dried and recrystallized from methanol. There are obtained 5.7 grams (57 percent of theory) 5-(4'-chloro-2'-furfurylamino-5'-sulphamoyl)-phenyl-tetrazole, which has a melting point of 220–223°C.

The 4-chloro-2-furfurylamino-5-sulphamoyl-benzonitrile used as starting material is prepared in the following manner:

210 milliliters thionyl chloride and 29.5 grams 4-chloro-2-fluoro-5-fulphamoyl-benzoic acid are boiled under reflux for 4 hours. After stripping off excess thionyl chloride with the use of benzene as entraining agent, the residue is cooled and carefully mixed with 200 milliliters of a cold, concentrated, aqueous solution of ammonia. After 12 hours, the reaction mixture is evaporated in a vacuum and filtered with suction. 21.6 Grams of the 4-chloro-2-fluoro-5-sulphamoyl-benzamide thus obtained (melting point 198–201°C) are boiled under reflux with 65 milliliters phosphorus oxychloride for 2 hours. After stripping off excess phosphorus oxychloride, the reaction mixture is carefully mixed, while cooling, with ice water, thoroughly stirred up and filtered with suction. There are obtained 15.6 grams 4-chloro-2-fluoro-5-sulphamoyl-benzonitrile, which has a melting point of 168–171°C.

8.65 Grams of this nitrile are introduced into 22 milliliters furfurylamine, complete solution being obtained with a strongly exothermic reaction. The solution, which has a temperature of 80–90°C., is immediately cooled to ambient temperature and, after 30 minutes, first mixed with water and then with acetic acid until it has a weakly acidic reaction. The reaction mixture thus obtained is thoroughly stirred up, filtered with suction, washed with water and dried. There are obtained 11.3 grams 4-chloro-2-furfurylamino-5-sulphamoyl-benzonitrile, which has a melting point of 238–242°C. (decomposition).

The following compounds are obtained in a manner analogous to that described above:

5-(4'-chloro-5'-sulphamoyl-2'-thenylamino)-phenyl-tetrazole
(Melting Point 218–221°C.; Yield 37 percent of theory)

Obtained by the reaction of 4-chloro-5-sulphamoyl-2-thenylamino-benzonitrile (melting point 170–174°C.) with sodium azide and ammonium chloride.

The 4-chloro-5-sulphamoyl-2-thenylamino-benzonitrile used as starting material is obtained by the reaction of 4-chloro-2-fluoro-5-sulphamoyl-benzonitrile with thenylamine in anhydrous tetrahydrofuran.

5-[4'-chloro-2'-(α-methyl-β-phenyl)-ethylamino-5'-sulphamoyl]-phenyl-tetrazole
(Melting Point 203–210°C. The sodium salt, which is resistant to hydrolysis, has a melting point 232–238°C. Yield 43 percent of theory)

Obtained by the reaction of 4-chloro-2(α-methyl-⅞-phenyl)-ethylamino-5-sulphamoyl-benzonitrile (melting point 142–145°C.) with sodium azide and ammonium chloride.

The 4 - chloro - 2 - (α-methyl-β-phenyl) - ethylamino-5-sulphamoyl-benzonitrile used as starting material is obtained by the reaction of 4-chloro-2-fluoro-5-sulphamoyl-benzonitrile with excess α-methyl-β-phenyl-ethylamine (benzedrine).

5-(2'-benzylamino-4'-chloro-5'-sulphamoyl)-phenyl-tetrazole
(Melting Point 251–252°C. The sodium salt, which is resistant to hydrolysis, has a melting point of 279–281°C.)

Obtained by the reaction of 2-benzylamino-4-chloro-5-sulphamoyl-benzonitrile (melting point 222–223°C.) with sodium azide and ammonium chloride.

The 2-benzylamino-4-chloro-5-sulphamoyl-benzonitrile used as starting material is obtained by the reaction of 2-benzylamino-4-chloro-5-sulphamoyl-benzamide with phosphorus oxychloride.

5-[4'-cholor-2'-(β-phenyl-ethylamino)-5'-sulphamoyl]-phenyl-tetrazole
(Melting Point 242–243°C. The sodium salt, which is resistant to hydrolysis, has a melting point of 263–265°C.)

Obtained by the reaction of 4-chloro-2-phenethylamino-5-sulphamoyl-benzonitrile (melting point 195–196°C) with sodium azide and ammonium chloride.

The 4-chloro-2-phenethylamino-5-sulphamoyl-benzonitrile used as starting material is obtained by the reaction of 4-chloro-2-phenethylamino-5-sulphamoyl-benzamide (melting point 225°C.) with phosphorus oxychloride.

EXAMPLE 2

5-(2'-Benzylamino-4'-trifluoromethyl-5'-sulphamoyl)-phenyl-tetrazole

2 Grams 5-(2'-amino-4'-trifluoromethyl-5'-sulphamoyl)-phenyl-tetrazole and 4 milliliters benzaldehyde are dissolved in 20 milliliters dimethyl formamide, 1 gram anhydrous sodium sulphate added thereto and the reaction mixture left to stand for 18 hours at ambient temperature. The solvent is then distilled off in a vacuum. The residue is thereafter taken up in 40 milliliters methanol and 8 milliliters water and mixed portionwise with 0.6 gram sodium borohydride. After one hour, the methanol is distilled off in a vacuum, the residue placed in water and acidified with 2N hydrochloric acid. The precipitated crude product is filtered off with suction, washed, dried and recrystallized twice from ethanol. There are obtained 0.58 grams (22 percent of theory) 5-(2'-benzylamino-4'-trifluoromethyl-5'-sulphamoyl)-phenyl-tetrazole, which has a melting point of 232°C. (decomposition).

The 5-(2'-amino-4'-trifluoromethyl-5'-sulphamoyl)-phenyl-tetrazole used as starting material is prepared in the following manner:

24 Grams 2-amino-4-trifluoromethyl-benzonitrile, 16.9 grams sodium azide and 13.9 grams ammonium chloride are heated, while stirring, for 30 hours at 100°C. in 360 milliliters dimethyl formamide and 36 milliliters water. The solvent is then distilled off in a vacuum, the oily residue mixed with water and rendered alkaline with a dilute solution of sodium hydroxide. The reaction mixture is now extracted with methylene chloride, the aqueous phase treated with activated charcoal, filtered and acidified with acetic acid. After filtering off with suction, washing and drying, there are obtained 22.7 grams 5-(2'-amino-4'-trifluoromethyl)-phenyl-tetrazole (melting point 205–206°C.). 22 Grams of this compound are introduced into 100 milliliters chlorosulphonic acid and heated to 120°C. for 2 hours. The reaction mixture is then allowed to cool to 90°C. and 8.4 milliliters phosphorus trichloride added dropwise thereto at this temperature, within the course of 2 hours. After 30 minutes, the reaction mixture is cooled and poured on to ice. The precipitate is filtered off with suction, washed with water and introduced, while stirring, into 185 milliliters concentrated aqueous ammonia solution. After stirring the reaction mixture for some time, activated charcoal is added thereto, followed by filtration and acidification of the filtrate with concentrated hydrochloric acid. The precipitated crude product is filtered off with suction, washed and recrystallized from 850 milliliters water. There are obtained 11.8 grams 5-(2'-amino-4'-trifluoromethyl-5'-sulphamoyl)-phenyl-tetrazole, which has a melting point of 244°C. (decomposition).

The compounds of this invention possess outstanding diuretic and saluretic properties. In order to establish the effectiveness of compounds representative of this invention as therapeutic agents for diuretic and saluretic purposes, the following series of tests were carried out.

The test animals were female Sprague-Dawley rats each weighing between 140–200 grams. The test animals were kept in climate controlled rooms at $23 \pm 1$°C. and a relative humidity of $60 \pm 5$ percent for at least one week prior to the tests. On the evening prior to the test day (i.e. 16 hours prior to administration of test compounds, the rats were left without food and had access only to drinking water. During the tests, groups of 5 animals each were placed into metabolic cages and six such groups of animals were used in the tests. The test compounds were administered to the test animals as a suspension in distilled water (Table 1) or in 0.5% tylose (Table 2) at the rate of 10 milliliters per kg. of body weight of each rat. The test preparations were injected intraperitoneally. The dosage in terms of milligrams of test compounds per kg. of body weight is set forth in Tables 1 and 2 below. Prior to the test and after two hours and again after six hours subsequent to the test, the bladders of the rats were emptied by squeezing, the urine content was measured, the chloride content in the urine was determined by titration, and sodium and potassium were determined by flame photometric tests.

The results are set forth in Tables 1 and 2, below:

The compounds tested were as follows:

A = 4-Chloro-N-(2-furylmethyl)-sulfamoylanthranilic acid = Furosemidum= Lasix.
1 = 5-(2'-Benzylamino-4'-chloro-5'-sulfamoyl)-phenyl-tetrazol.
2 = 5-(4'-Chloro-5'-sulfamoyl-2'-thenylamino)-phenyl-tetrazol.
3 = 5-(2'-Benzylamino-4'-trifluoromethyl-5'-sulfamoyl)-phenyl-tetrazol.

It can be seen from the data set forth in Tables 1 and 2 that compounds representative of this invention, when injected intraperitoneally, are more effective than the standard substance 4-chloro-N-(2-furylmethyl)-5-sulfamoylanthranilic acid with respect to water and Na+ secretion in the urine of rats. The three test compounds representative of this invention elicited equally high or higher values for the Na/K ratios as 4-chloro-N-(2-furylmethyl)-5-sulfamoylanthranilic acid, i.e. they are at least as effective in saving potassium as the standard substance.

The compounds of this invention are used in diuretic and saluretic applications in a manner known to those skilled in the art. For instance, they may be administered in tablet form, in which a tablet may contain 40 milligrams of active substance, or in liquid form in, e.g. 2 milliliters ampules. Typical dosage rates are one tablet per day or, if no effect is gained, two additional tablets after six hours and as needed. Specific use applications and formulations are similar to those for the standard diuretic substance sold under the tradename "Lasix" by Farbwerke Hoechst, AG, Germany.

WHAT IS CLAIMED IS:

1. A 5-Phenyl-tetrazole derivative of the formula:

wherein X is a halogen atom, an azido group or a trifluoromethyl radical, $R_1$ is a hydrogen atom or a lower alkyl radical, $R_2$ is a phenyl, furyl or thienyl radical and $n$ is 0, 1 or 2; and the pharmacologically compatible salts thereof.

2. Compound as claimed in claim 1 wherein X is a halogen atom.

TABLE 1.—DIURETIC EFFECTIVENESS IN INTRAPERITONEAL INJECTION OF RATS
(Test compounds in distilled water suspension)

| Test compound | Dosage, mg./kg. | Separation/kg. during— | | | | | | | | | |
|---|---|---|---|---|---|---|---|---|---|---|---|
| | | Two hours | | | | | Six hours | | | | |
| | | Ml. urine | Cl | Na | K | Na/K | Ml. urine | Cl | Na | K | Na/K |
| Control | | 9.4 | 0.09 | 0.102 | 0.279 | 0.4 | 12.4 | 0.29 | 0.248 | 0.64 | 0.4 |
| A | 1 | 7.1 | 0.10 | 0.066 | 0.236 | 0.3 | 11.0 | 0.35 | 0.32 | 0.61 | 0.5 |
| | 4 | 25.1 | 2.40 | 1.8 | 0.74 | 2.4 | 27.6 | 2.44 | 1.91 | 1.16 | 1.7 |
| | 16 | 42.3 | 5.06 | 3.88 | 1.16 | 3.4 | 44.1 | 5.11 | 3.96 | 1.63 | 2.4 |
| 1 | 1 | 8.3 | 0.10 | 0.051 | 0.229 | 0.2 | 11.5 | 0.27 | 0.208 | 0.68 | 0.3 |
| | 4 | 28.6 | 3.17 | 2.24 | 0.82 | 2.7 | 30.5 | 3.22 | 2.29 | 1.24 | 1.9 |
| | 16 | 47.8 | 6.40 | 4.9 | 1.26 | 3.9 | 49.8 | 6.55 | 4.98 | 1.77 | 2.8 |

NOTE.—Cl, Na, and K values reported as milliequivalents.

TABLE 2.—DIURETIC EFFECTIVENESS IN INTRAPERITONEAL INJECTION OF RATS
(Test compounds in 0.5% Tylose* suspension)

| Test compound | Dosage, mg./kg. | Separation/kg. during— | | | | | | | | | |
|---|---|---|---|---|---|---|---|---|---|---|---|
| | | Two hours | | | | | Six hours | | | | |
| | | Ml. urine | Cl | Na | K | Na/K | Ml. urine | Cl | Na | K | Na/K |
| Control | | 9.4 | 0.11 | 0.06 | 0.26 | 0.2 | 13.7 | 0.42 | 0.293 | 0.7 | 0.4 |
| A | 1 | 7.0 | 0.15 | 0.048 | 0.19 | 0.3 | 10.7 | 0.48 | 0.24 | 0.6 | 0.4 |
| | 4 | 25 | 2.5 | 1.78 | 0.75 | 2.4 | 27 | 2.6 | 1.86 | 1.1 | 1.7 |
| | 16 | 43 | 5.5 | 4.03 | 1.1 | 3.7 | 45 | 5.6 | 4.1 | 1.48 | 2.8 |
| 2 | 2 | 18.1 | 1.56 | 1.01 | 0.51 | 2.0 | 20.9 | 1.76 | 1.19 | 0.88 | 1.3 |
| | 6 | 53.1 | 6.16 | 4.77 | 1.14 | 4.2 | 54.5 | 6.61 | 5.04 | 1.81 | 2.8 |
| | 12 | 53.1 | 7.07 | 5.43 | 1.19 | 4.5 | 63.0 | 8.90 | 6.19 | 2.11 | 2.9 |
| 3 | 12 | 31.1 | 4.48 | 3.68 | 0.87 | 4.25 | 34.5 | 4.52 | 3.76 | 1.85 | 2.03 |
| | 25 | 38.7 | 5.72 | 4.49 | 1.18 | 3.8 | 43.0 | 6.10 | 4.76 | 2.19 | 2.17 |

*Tylose=water soluble cellulose-ether.
NOTE.—Cl, Na, and K values reported as milliequivalents.

3. Compound as claimed in claim 1 wherein X is an azido group.

4. Compound as claimed in claim 1 wherein X is a trifluoromethyl radical.

5. Compound as claimed in claim 1 wherein said 5-phenyl-tetrazole derivative is 5-(2'-benzylamino-4'-chloro-5'-sulfamoyl)-phenyltetrazole.

6. Compound as claimed in claim 1 wherein said 5-phenyl-tetrazole derivative is 5-(4'-chloro-5'-sulfamoyl-2'-thenylamino)-phenyltetrazole.

7. Compound as claimed in claim 1 wherein said 5-phenyl-tetrazole derivative is 5-(2'-benzylamino-4'-trifluoro-methyl-5'-sulfamoyl)-phenyltetrazole.

* * * * *

UNITED STATES PATENT OFFICE
CERTIFICATE OF CORRECTION

Patent No. 3,665,002          Dated May 23, 1972

Inventor(s) Alfred Popelak, Ansgar Lerch, Kurt Stach, Egon Roesch, Klaus Hardebeck It is certified that error appears in the above-identified patent and that said Letters Patent are hereby corrected as shown below:

Col. 3, line 12                    "fulphamoyl"

should be                          --sulphamoyl--

Col 3, line 54                     "-7/8-"

should be                          -- -ß- --

Col.3, line 72                     "cholor"

should be                          --chloro--

Signed and sealed this 5th day of December 1972.

(SEAL)
Attest:

EDWARD M. FLETCHER, JR.            ROBERT GOTTSCHALK
Attesting Officer                   Commissioner of Patents